Patented Dec. 30, 1941

2,268,173

UNITED STATES PATENT OFFICE 2,268,173

RESINOUS COMPOSITION

Ben E. Sorenson, Upper Darby, Pa., assignor to E. I. du Pont de Nemours & Company, Wilmington, Del., a corporation of Delaware No Drawing. Application January 3, 1939, Serial No. 249,155

3 Claims. (Cl. 260—70)

This invention relates to resinous materials, and more particularly to the manufacture of resinous compositions adapted for use as decorative and protective films as well as for the production of molded products.

The products of the reaction of urea and aldehydes, particularly formaldehyde, are well known. Such products possess desirable properties of hardness and strength, and further, have excellent color and fastness to light. They are, however, of limited solubility and in baked films tend to be extremely brittle and lacking in proper toughness. It has also been suggested to condense formaldehyde with N,N'-dicarbamyl polymethylene diamines in the presence of alcohols, but the products heretofore obtained from these ingredients are unsatisfactory in the coating art in that they yield weak, water sensitive films. These films, in addition to being water sensitive, crumble after a few minutes' immersion in water.

This invention has as an object the preparation of new and useful resinous compositions. A further object is the manufacture of resins from formaldehyde and N,N'-dicarbamyl polymethylene diamines of improved flexibility and resistance to exposure to the weather. A further object resides in a process for obtaining these resinous compositions. Other objects will appear hereinafter.

These objects are accomplished by condensing an N,N'-dicarbamyl polymethylene diamine with formaldehyde in the presence of an excess of a monohydric alcohol under alkaline conditions, followed by a final condensation in an acid medium at reflux temperature, under conditions whereby the water formed during the reaction is removed from the sphere of action.

In the practice of this invention a mixture of an N,N'-dicarbamyl polymethylene diamine, formaldehyde, and a monohydric alcohol in amount in excess of at least two mols per mol of N,N'-dicarbamyl polymethylene diamine is heated in the presence of a material of alkaline reaction (in amount sufficient to give the reaction mixture an alkaline reaction) until solution is complete. The pH of the solution is then adjusted to acidity by addition of a material of acid reaction, and heating is continued under conditions such that the water of reaction is removed and the alcohol returned to the reaction mixture, until approximately two mols of water per mol of N,N'-dicarbamyl polymethylene diamine have been removed. In actual practice the amount of alcohol used is adjusted so that it will function both as a reactant and as a solvent for the reaction product.

The manner of carrying out the present invention will be more fully understood by the following examples in which parts are by weight.

Example I

Seventy-two (72) parts of a 37% aqueous solution of formaldehyde and 1 part of sodium dihydrogen phosphate ($NaH_2PO_4$) were placed in a one-liter flask and the pH adjusted to 8 by the addition of dilute sodium hydroxide (10% aqueous solution). Eighty (80) parts of N,N'-dicarbamyl hexamethylene diamine and 400 parts of isobutyl alcohol were then added and the mixture heated in a steam bath at 90°–100° C. for forty minutes. A clear solution resulted; 2 parts of phthalic anhydride (acid catalyst) and 20 parts of toluene were then added and a fractionating column with a water-separating head attached. Distillation was allowed to proceed at such a rate as to permit removal of water through the separator head at a rate of about one part every three minutes, while the alcohol was continuously returned to the reaction vessel. Distillation was continued until practically no more water distilled over. The distillation was then continued beyond this point, and the distillate (alcohol and toluene) removed through the separator head. This continued distillation served to remove the last traces of water from the reaction vessel and also served to concentrate the solution. Distillation was continued until the solution in the flask contained approximately 40% solids.

A portion of this solution was poured onto a glass plate and an even film produced by means of a doctor knife. When baked for ten minutes at 100° C. a tough, tack-free film resulted. The film was unaffected by water after soaking 1.5 hours.

To 2 parts of a 50% isobutanol solution of the resin of Example I was added 1 part of a 50% toluene solution of a 2.5:1 China-wood oil-linseed oil modified polyhydric alcohol-polycarboxylic acid resin, the resulting composition sprayed over primed steel, and the coated panel baked for one hour at 100° C. After one year's outdoor exposure the panel was examined at which time the finish was found still to be in good condition.

Example II

One hundred thirty-one (131) parts of 37% aqueous formaldehyde were placed in a flask and the pH adjusted to 8.2 to 9.0 with 10% sodium hydroxide. Fifty-one (51) parts of N,N'-dicarbamyl dimethylene diamine and 122 parts of isobutanol were added and the reaction mixture refluxed for thirty minutes. Two (2) parts of phthalic anhydride (catalyst) and 12 parts of toluene were then added and refluxing continued. The water formed during the reaction was slowly drawn off through a water-separating head at the top of the fractionating column. One hundred three (103) parts of water were withdrawn. The resin was then concentrated by distilling out 60 parts of alcohol-toluene mixture, yielding a final product containing 65% solids. When a film of this resin was baked at 100° C. for eighteen hours a hard, clear film resulted.

*Example III*

One (1) part of sodium dihydrogen phosphate was dissolved in 100 parts of 37% aqueous formaldehyde and the pH of the solution adjusted between 8 and 9 by the addition of 10% sodium hydroxide. The formaldehyde solution with 570 parts of isobutanol and 114 parts of N,N'-dicarbamyl hexamethylene diamine were placed in a three-necked flask equipped with a thermometer in the liquid, an efficient agitator and a reflux condenser. The charge was agitated and heated at 90°-100° C. until solution of the diamine was complete. The time required was from 1 to 3 hours. To the solution were added 60 parts of toluol and 1.5 parts of phthalic anhydride and a fractionating head with a water separating head was attached. The charge was heated to distillation temperature until 82 parts of water had been removed. The resin was concentrated by distilling out 275 parts of solvent, neutralized with 10% alcoholic sodium hydroxide, using phenolphthalein as an indicator, and then filtered. The resin thus prepared has a solids content of 35-40% and a viscosity of N-S (Gardner-Holdt scale).

The term N,N'-dicarbamyl polymethylene diamine is used herein to refer to compounds having the general formula

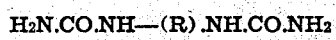

$$H_2N.CO.NH—(R).NH.CO.NH_2$$

wherein R contains from 2 to 18 carbons and which may form part of a cyclic ring or of a bivalent radical which may consist solely of carbon atoms or which may be interrupted by oxygen or sulfur atoms.

In many instances, particularly in the case of the more concentrated solutions, it is desirable to neutralize the acidity of the resin in order to improve the stability of said solutions on aging.

The properties of the final resin will vary somewhat depending upon the chemical structure of the N,N'-dicarbamyl polymethylene diamine. For example, the presence of oxygen in the chain will tend to produce resins of greater solubility in oxygenated organic solvents, and the longer hydrocarbon chains will tend to decrease water sensitivity.

Other suitable N,N'-dicarbamyl polymethylene diamines which may be used in the practice of this invention, in addition to those mentioned diamine, N,N'-dicarbamyl trimethylene diamine, in the examples, are N,N'-dicarbamyl ethylene N,N'-dicarbamyl pentamethylene diamine, N,N'-dicarbamyl octamethylene diamine, N,N'-dicarbamyl undecamethylene diamine, N,N'-dicarbamyl dodecamethylene diamine, N,N'-dicarbamyl 1,18-octadecamethylene diamine, and N,N'-dicarbamyl 1,12-octadecamethylene diamine, N,N'-dicarbamyl 1,1'-xylylene diamine, N,N'-dicarbamyl 1,1'-phenylene diamine, etc. Still others which may be used are the N,N'-dicarbamyl derivatives of diaminodiethyl ether, diaminodipropyl ether, diaminocyclohexane, di-(aminomethyl) - cyclohexane, diaminodiethyl sulfide, diaminodipropyl sulfide, and di-(aminomethyl)-dioxane.

In place of the formaldehyde of the examples, paraformaldehyde, trioxymethylene, etc., may be used.

Among suitable alcohols which may be employed in this process are methyl, ethyl, n-propyl, isopropyl, n-butyl, isobutyl, n-amyl, and isoamyl. The lower alkyl alcohols such as methyl and ethyl produce resins which are soluble in water, while those of medium chain length such as butyl and amyl produce water-insoluble resins. Alcohols such as benzyl, cyclohexyl and octyl yield resins which are in general less soluble than those prepared from the lower alkyl alcohols.

Benzene, xylene, and other hydrocarbons may be used in place of the toluene which is given in the examples. With the use of some alcohols it may not be necessary to use in addition a hydrocarbon since the water may be satisfactorily removed by other means, as for instance by the use of silica gel in the separator, or by the use of an auxiliary fractionating column to separate the water from the alcohol before the latter is returned to the reaction vessel.

In place of the phthalic anhydride used in the examples as catalyst, other materials of an acidic nature such as acetic and similar aliphatic acids, benzoic and similar aryl monocarboxylic acids, maleic acid, adipic acid and similar aliphatic dicarboxylic acids as well as such tricarboxylic acids as citric acid, also acid salts and acid resins such as rosin, etc. may be used; further, inorganic acids such as hydrochloric, sulfuric and phosphoric acids are satisfactory.

Although the products prepared by the process of this invention are flexible and tough, it is often advantageous to use them in conjunction with modifying agents such as fillers and plasticizers. Among the plasticizers which can be employed may be mentioned blown castor oil, hydrogenated castor oil phthalates, castor oil modified polyhydric alcohol-polycarboxylic acid resins, isobutanol modified urea-formaldehyde resins, linseed oil-China-wood oil modified polyhydric alcohol-polycarboxylic acid resins, and China-wood oil. Still other types of plasticizers which may be used are tricresyl phosphate, dicresoxydiethyl ether, and dibutyl phthalate. They may also be used in conjunction with certain cellulose derivatives such as nitrocellulose, ethyl cellulose, and cellulose acetate.

Typical applications of my new resinous compositions are molded articles, unsupported films, electrical insulation (e. g., enamel type coatings for wires), impregnating agents, adhesives, and coating compositions over wood, metal, cloth or paper. Advantages which the products of this process have over urea-formaldehyde resins are that they are more flexible and possess greater resistance to outdoor exposure (e. g., sun and water). The films, probably due to their high carbon content, are outstanding in durability, resistance to water and sunlight, and gloss retention on long exposure to the weather. These properties, together with the extreme toughness and flexibility of the films, are especially valuable in the coating composition art.

As many apparently widely different embodiments of this invention may be made without departing from the spirit and scope thereof, it is to be understood that I do not limit myself to the specific embodiments thereof except as defined in the appended claims.

I claim:

1. A process which comprises heating an alkaline mixture of ingredients comprising an N,N'-dicarbamyl polymethylene diamine and formaldehyde, and a monohydric alcohol at least in excess of two mols per mol of N,N'-dicarbamyl polymethylene diamine under alkaline conditions until solution is complete, then while continuing the reaction acidifying the solution, distilling and condensing the mixed vapors of alcohol and water evolved, separating the water from the condensate and returning the alcohol from which the water has been separated to the reaction mixture, continuing said heating with separation of water and return of alcohol to the reaction mixture until at least about two mols of water of reaction per mol of N,N'-dicarbamyl polymethylene diamine have been removed, and until the resulting solution yields on baking a tough, water-resistant film and then neutralizing residual acidity by addition of alkali.

2. The process set forth in claim 1 in which said N,N'-dicarbamyl polymethylene diamine is N,N'-dicarbamyl hexamethylene diamine.

3. The process set forth in claim 1 in which said N,N'-dicarbamyl polymethylene diamine is N,N'-dicarbamyl dimethylene diamine.

BEN E. SORENSON.